United States Patent
Judd et al.

(10) Patent No.: US 7,133,697 B2
(45) Date of Patent: Nov. 7, 2006

(54) TRANSLATION UNIT FOR WIRELESS COMMUNICATIONS SYSTEM

(75) Inventors: Mano D. Judd, Rockwall, TX (US); Kevin W. Ommodt, Allen, TX (US); Johnsy C. Varghese, The Colony, TX (US)

(73) Assignee: Andrew Corporation, Westchester, IL (US)

(*) Notice: Subject to any disclaimer, the term of this patent is extended or adjusted under 35 U.S.C. 154(b) by 450 days.

(21) Appl. No.: 10/145,298

(22) Filed: May 14, 2002

(65) Prior Publication Data

US 2003/0036410 A1  Feb. 20, 2003

Related U.S. Application Data

(60) Provisional application No. 60/290,882, filed on May 14, 2001.

(51) Int. Cl.
*H04B 1/38* (2006.01)

(52) U.S. Cl. .............. 455/561; 455/11.1; 455/560

(58) Field of Classification Search .......... 455/11.1, 455/561, 560, 7
See application file for complete search history.

(56) References Cited

U.S. PATENT DOCUMENTS

| | | | |
|---|---|---|---|
| 4,783,843 A | 11/1988 | Leff et al. | 455/22 |
| 4,941,200 A | 7/1990 | Leslie et al. | 455/17 |
| 5,509,028 A | 4/1996 | Marque-Pucheu | 375/211 |
| 5,604,789 A | 2/1997 | Lerman | 379/59 |
| 5,659,879 A | 8/1997 | Dupuy | 455/15 |
| 5,802,452 A | 9/1998 | Grandfield et al. | 455/20 |
| 5,812,933 A | 9/1998 | Niki | 455/16 |
| 5,835,128 A | 11/1998 | Macdonald et al. | 348/8 |
| 5,883,884 A | 3/1999 | Atkinson | 370/279 |
| 5,890,055 A | 3/1999 | Chu et al. | 455/16 |
| 6,047,177 A | 4/2000 | Wickman | 455/422 |
| 6,141,533 A | 10/2000 | Wilson et al. | 455/11.1 |
| 6,243,577 B1 | 6/2001 | Elrefaie et al. | 455/426 |
| 6,684,058 B1 * | 1/2004 | Karacaoglu et al. | 455/20 |
| 6,690,662 B1 * | 2/2004 | Komara et al. | 370/342 |

FOREIGN PATENT DOCUMENTS

| | | |
|---|---|---|
| DE | 40 08 165 | 8/1991 |
| EP | 0714218 A1 * | 11/1994 |
| EP | 0714218 A1 | 5/1996 |
| EP | 0756392 A2 * | 7/1996 |
| EP | 0 756 392 | 1/1997 |
| EP | 1 143 554 | 10/2001 |
| WO | W) 97/32442 * | 9/1997 |
| WO | WO 97/32442 A1 | 9/1997 |
| WO | WO 01/11797 | 2/2001 |

* cited by examiner

*Primary Examiner*—Nay Maung
*Assistant Examiner*—Angelica M. Perez
(74) *Attorney, Agent, or Firm*—Wood, Herron & Evans, L.L.P.

(57) ABSTRACT

A translation unit for use in a wireless communications system comprises translation circuitry configured to be interfaced between an RF antenna network and a backhaul network. The translation circuitry is operable for translating the frequency of signals directly between an RF network and a backhaul network without conversion to audio in order to provide direct communications between a base station and a backhaul destination.

34 Claims, 11 Drawing Sheets

TRANSLATION UNIT FOR WIRELESS COMMUNICATIONS SYSTEM

RELATED APPLICATIONS

This application claims the filing benefit of Provisional Application U.S. Ser. No. 60/290,882, filed May 14, 2001, entitled "Translation Unit for Wireless Communications System", the disclosure of which is hereby incorporated herein by reference in its entirety.

FIELD OF THE INVENTION

This invention is directed generally to wireless communications and more particularly to an improvement in cell tower electronics for such a communications system.

BACKGROUND OF THE INVENTION

In many wireless communication stations, such as cellular/PCS base stations, RF communication signals are received by an antenna at the top of a tower, routed down to equipment at the base of a tower ("base station"), downconverted from RF, and demodulated to audio. For further processing, the signals are then routed back to a Mobile Switching Center (MSC), Central Office (CO), or other facility, using another wireless communication link or using a wired link, such as a T1 line. This routing back to the MSC/CO is referred to as backhaul.

About 80% of all base stations route the signals back to the MSC/CO via a microwave backhaul link. That is, the base station signals are converted to microwave backhaul. More specifically, at the base station, the audio signals are arranged or stacked and are upconverted to IF. The signals are then remodulated, usually using a different modulation scheme, and converted to a microwave frequency. They are then amplified and transmitted out via a microwave antenna or dish. The modulation and other signal processing is traditionally handled at the ground level of the tower, while the conversion to a microwave spectrum may be handled on the ground or on the tower. The primary reason for this whole complicated loop is that the RF Cellular/PCS signals are spread apart in the RF band, due to frequency re-use, and often occupy distinct bands, like a comb. For example, in a typical TDMA system, total comb bandwidth is around 12.5 MHz. However, the microwave link bandwidths are often much narrower.

In order to limit the microwave bandwidth which must be purchased in order to facilitate the backhaul, the base stations have had to utilize expensive modulation/demodulation equipment utilizing digital signal processing or DSP and other supporting circuitry at the base station. For example, the RF wireless communication signals have to be up/down converted and modulated/demodulated down to audio, and then again up/down converted and modulated/demodulated for the microwave backhaul and have to be multiplexed from the RF side with the microwave hardware. For microwave transmissions, the multiplexed audio streams are modulated/demodulated with a different modulation scheme, such as QAM 256, and are up/down converted with respect to the microwave band. The modulation hardware and associated DSP functions are expensive and must be duplicated at all base stations using microwave backhaul. Because the base station hardware takes a larger RF bandwidth and backhauls it over a smaller microwave bandwidth, the base station hardware is considered to provide a spectrum compression mechanism. Without such spectrum compression, it would be necessary to purchase a greater amount of expensive microwave backhaul bandwidth for the backhaul function.

It is therefore desirable to reduce, and even eliminate, the expensive modulation/demodulation hardware associated with the base station and its backhaul functions. More specifically, it is desirable to eliminate the need for complicated DSP functions and associated hardware at the base station.

It is further desirable to simplify the base station and reduce its overall construction and maintenance costs, while still maintaining the convenient and desirable microwave backhaul function.

It is further desirable to achieve these goals without having to purchase an increased amount of an expensive backhaul bandwidth from the traditional microwave backhaul spectrum.

These goals and improvements, and other features, are addressed by the present invention.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE ILLUSTRATED EMBODIMENT

Figure 1:
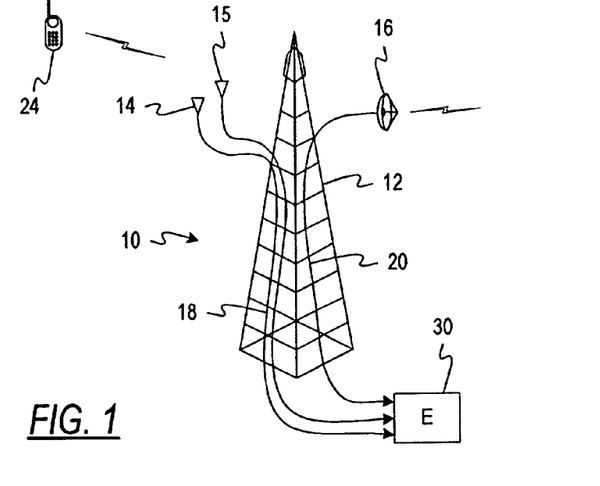
FIG. 1 is a schematic diagram showing a tower and base station in accordance with the traditional backhaul capabilities.

Referring now to the drawings, and initially to FIG. 1, a cell tower or base station and tower installation in accordance with traditional backhaul capabilities is illustrated for the purposes of explaining the invention. The installation 10 includes a tower 12 or other suitable structure, for mounting one or more base station antennas 14, 15 (e.g. for transmit and receive) well above ground level. In accordance with traditional backhaul in such installations, communications with a switching center or central office (MSC/CO) are accommodated through a backhaul link which in FIG. 1 is illustrated as a microwave backhaul link, utilizing a microwave antenna 16, also mounted at or near the top of the tower or other structure 12. Respective cables 18 and 20 connect the antennas 14, 15 and the backhaul link antenna 16 to base station electronics 30 which provide the proper processing and interface between the RF side and the microwave backhaul.

As mentioned above, in the cellular/PCS base station equipment of this type, an RF signal is utilized to communicate with a plurality of mobile units or individual users 24. In this regard, the cellular or PCS signals are spread apart, often occupying relatively small or narrow bands in a comb-like fashion. To handle the traffic, the entire comb-like bandwidth must be processed and backhauled, which includes around 12.5 MHz of bandwidth. Typically, the bandwidth of the microwave backhaul link using the antenna 16 is much narrower than the 12.5 MHz RF communication bandwidth. Accordingly, in order to utilize the backhaul link or antenna 16, the base station electronics 30 must perform all of the necessary and expensive digital signal processing (DSP), compression, and conversion between the RF signals transmitted and received by antennas 14, 15 and the microwave backhaul signals transmitted and received by antenna 16.

Because of the difference in spectral efficiency between the RF spectrum and the microwave backhaul spectrum, service providers have found it necessary to maintain the expensive DSP hardware at each base station site to handle the modulation/demodulation and compression between the RF and backhaul spectrums. An example may be illustrative.

For AMPS, cellular or TDMA (IS-136), the bandwidth requirement can be estimated as follows:

In TDMA, using k=7 frequency re-use, the cell site spectral efficiency is around $\frac{1}{7} \times 0.8$ bps/Hz=0.11 bps/Hz without spectrum compression. (bps=bits per second)

For backhaul, the bps/Hz ratio, or spectral efficiency, is often much higher. For example, for 256 QAM modulation, the efficiency is around 8 bps/Hz, which is significantly more spectrally efficient. Using fixed wireless access (e.g., MMDS), the spectral efficiency may be on the order of 4–6 bps/Hz, over a 6 MHz channel. A simple per cell site example then, for an FDMA(AMPS) arrangement, assuming about 8 kbps per channel, is set forth as:

| FDMA (AMPS): | | | |
|---|---|---|---|
| K = 7 → | 60 ch (8 kbps/ch)/12.5 E6 = 0.0384 bps/Hz | | |
| K = 4 → | 105 ch (8 kbps/ch)/12.5 E6 = 0.0672 bps/Hz | | |
| Full Site Spectrum | Effective RF Spectrum | Site bits | Backhaul @ 6 bits/Hz |
| k = 7 12.5 MHz | 60 × (30 KHz) = 1.8 MHz | 480 kbps | 80 KHz |

Therefore, the RF spectrum requires about 156 times the bandwidth as necessary for a backhaul spectrum. Thus, it is usually considered better to demodulate and compress at the cell-site.

TDMA without demodulation and compression provides somewhat more favorable efficiency in that the RF spectrum would require about 52 times the bandwidth as necessary for a backhaul spectrum.

For 3G/CDMA systems, assuming a full multicarrier (simple translation), and about 0.5 bps/Hz and a backhaul efficiency of around 6 bps/Hz, the RF spectrum would require around 12 times the spectrum as necessary for a backhaul spectrum.

For CDMA, assuming adjacent carriers, the spectrum efficiency is roughly:
  0.49 bits/Hz using all 64 signals/carrier
  0.25 bits/Hz using only 32 signals/carrier.

For fixed wireless, the spectral efficiency will improve even more, and it is likely that a 1:1 bps/Hz efficiency may be achieved between the RF system and backhaul spectrum.

In accordance with one aspect of the present invention, the use of expensive modulation/demodulation and DSP hardware is reduced and even eliminated from the base station. Specifically, modulators and demodulators for converting from the RF communication band to a digital audio stream, and the modulator/demodulator hardware for providing the necessary compression and conversion between the RF band and the microwave backhaul spectrum are eliminated. In one aspect of the invention, conversion occurs directly between the RF spectrum and the backhaul spectrum without modulation and demodulation. The conversion occurs completely at the base station and any modulation and demodulation involving expensive DSP hardware occurs after the backhaul, such as at a MSC. In that way, the DSP function (and cost) is centralized for a plurality of base stations at the MSC/CO. In an embodiment of the invention, the conversion may occur on the tower without being routed to base station electronics on the ground at the base of the tower. The present invention may utilize an inexpensive backhaul spectrum to handle the complete RF spectrum. Alternatively, newer CDMA/3G spectral efficiencies are utilized for reducing the required backhaul spectrum. With the allocation of the LMDS (Local Multipoint Distribution Services) 28 GHz band (some 1300 MHz total bandwidth), which is mostly unused today, and for the foreseeable future, a Cellular/PCS provider can obtain 12.5 or 25 MHz of this 1300 MHz bandwidth, likely at the same price (or lower) than they currently pay for a smaller amount of the microwave backhaul spectrum. The invention recognizes that, using this approach, a simple RF to LMDS band (and visa-versa) converter at the top of the tower is the only significant piece of hardware that would be required. Therefore, the cost requirements to compress the spectrum at the base station location are removed.

While one described embodiment may use the above-discussed PCS/cellular and LMDS bands, the invention may be used in other bands as well. For example, any unused (unlicensed) band with sufficient available bandwidth could be used in place of the LMDS band. Also, such a system could be used to facilitate a wireless backhaul link for communications systems other than PCS/cellular, i.e., using other RF bands.

In describing the invention, a brief description of a traditional backhaul scenario is helpful.

Figure 2:
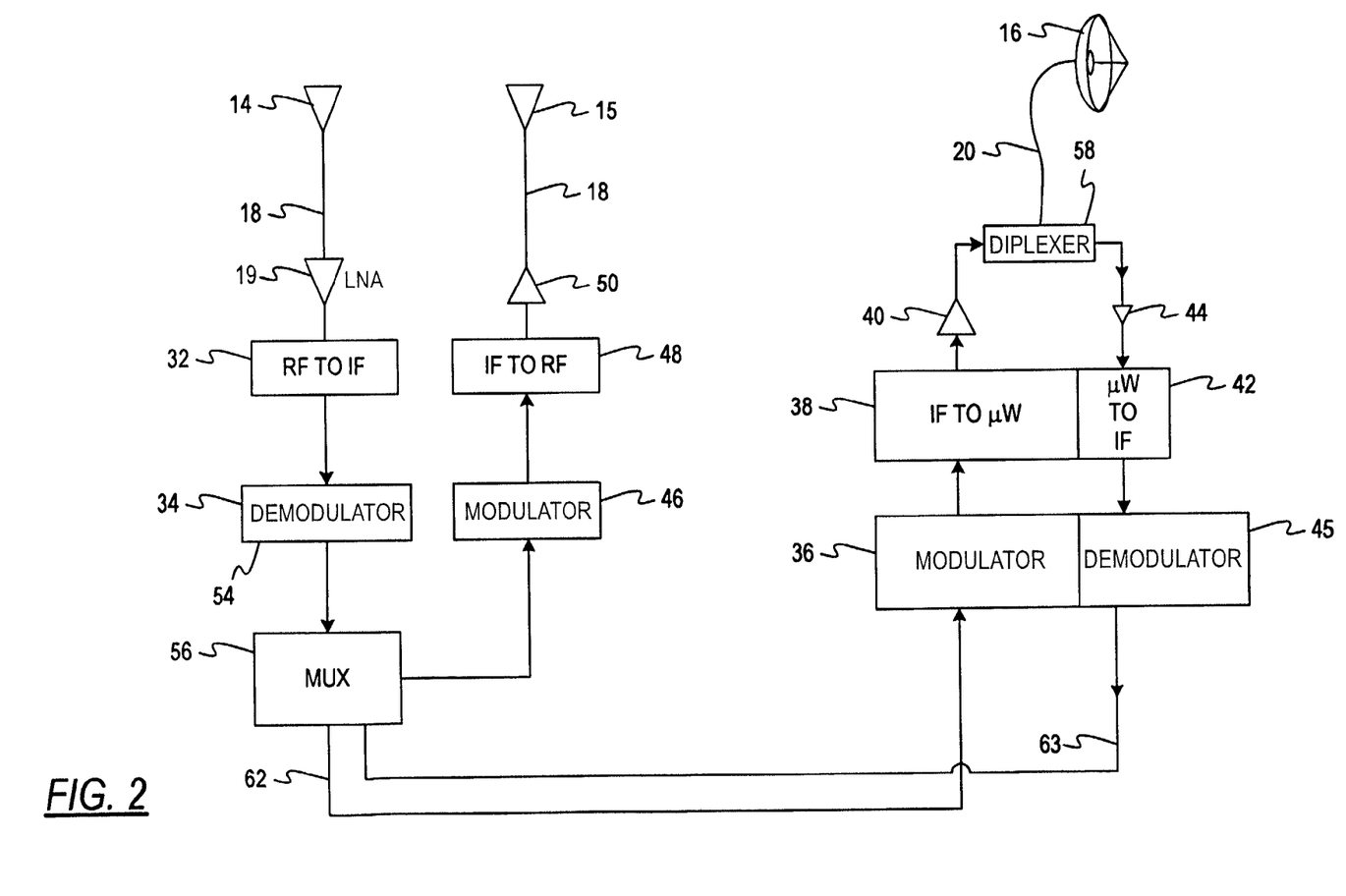
FIG. 2 is a block diagram of base station hardware for traditional backhaul capabilities.

Referring to FIG. 2, the base station electronics 30 typically include circuitry 32 for downconverting RF signals from the antenna 14 to an IF frequency, as well as circuitry 34 for digitizing the signals and demodulating to audio. In the downlink path, signals received by antenna 14 are routed on line 18 to an amplifier, such as an LNA 19, before being downconverted to IF. Also, appropriate filters (not shown) might be utilized for filtering the individual RF channels received at antenna 14 prior to downconverting each channel to IF. Demodulator circuitry 34 also may include digitizing circuitry for digitizing each channel. A digital audio data stream is then created for each channel and is multiplexed with a multiplexer (MUX) 56 to form a high speed data stream. Downlinked signals are then routed on line 62 to modulator circuitry 36 where the high speed digitized data stream is again modulated (usually with a different modulation scheme) and upconverted to IF. The IF signals are then upconverted to a microwave spectrum with appropriate conversion circuitry 38 wherein they are amplified, such as with a power amp 40. A diplexer 58 is necessary for separating backhaul uplink/downlink signals. Utilizing diplexer 58, the signals are routed via cable 20 to the backhaul antenna 16 for backhauling to a MSC/CO or other switching center. All the circuitry for up/down conversion and modulation/demodulation may be located at the bottom of the tower. Alternatively, some of the hardware, such as the up/down conversion circuitry and the amplifiers might be located at the top of the tower proximate the antenna.

Signals arriving from the central office (CO) via the backhaul link antenna 16 would be fed to the base station electronics by the cable 20, through diplexer 58 where they are amplified, such as with an LNA 44, and then downconverted with appropriate circuitry 42 to IF frequencies.

Appropriate demodulator circuitry demodulates and digitizes the signals which are then routed, via line 63, to be demultiplexed by the multiplexer circuitry 56 for transmission through antenna 15. The digitized stream of the audio base band is then modulated and converted to appropriate IF signals by modulator circuitry 46. The signals are then upconverted to an RF band by appropriate conversion circuitry 48 for transmission. The signals are amplified, such as with a power amplifier 50, and then routed on line 18 to be transmitted to customers or mobile units 24.

As noted above, the various modulation circuitry utilized incorporates digital signal processing (DSP), which is expensive and, for a traditional backhaul, must be incorporated with each base station. Also, such circuitry is necessary for both the RF side and the backhaul side of the system. Lines 63 and 62 may be T1 lines, or other high capacity lines, which may also be utilized to route the high speed stream directly to an MSC/CO, as well as to a backhaul link 16. In the present invention, the use of wireless backhaul is addressed. For use of the microwave antenna backhaul link 16, the base station modulator circuitry 36 might contain circuitry to remodulate the signal, with a high bps/Hertz rate such as QAM 256, prior to upconverting the signal to microwave 38.

Figure 3:
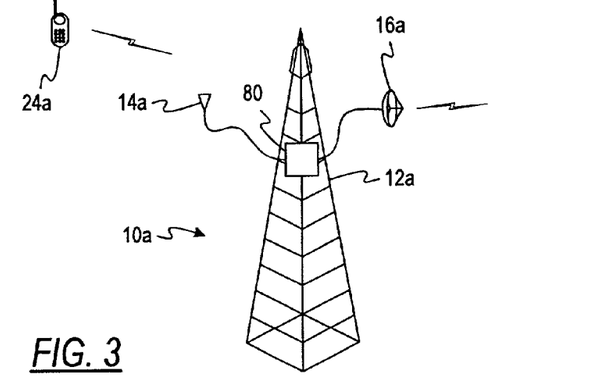
FIG. 3 is a schematic diagram of a tower and base station, in accordance with one embodiment of the invention.

Referring now to FIG. 3, in accordance with one embodiment of the invention, the expensive modulation/demodulation and DSP circuitry is eliminated from the base station. A system 10*a* includes a tower or other structure 12*a* which mounts a base station antenna 14*a* for an RF wireless communication system and a microwave antenna or dish 16*a* for a backhaul link to a MSC/CO. In the present invention, the use of the terms "switching center" or "central office" for indicating a destination for the backhaul is not meant to be limiting to a particular type of destination. For example, multiple base stations might backhaul to another base station where DSP and modulation circuitry is present. Then, after processing and modulation/demodulation, the signals might be further backhauled to a traditional MSC/CO. Therefore, for the purposes of the invention, the terms "switching center" or "backhaul destination" may also mean another base station or some other destination. A translation unit 80 is provided at or near the tower top for providing bi-directional upconversion and downconversion respectively between the RF band and a backhaul band (e.g., microwave) used by the backhaul link antenna 16*a* and associated equipment at the MSC/CO.

In accordance with one aspect of the present invention, RF signals from antenna 14*a* are translated directly to a microwave spectrum for backhaul. In one embodiment of the invention, a low cost microwave spectrum bandwidth is used which is similar in size to the bandwidth of the RF spectrum. In such an embodiment, the difference in spectral efficiency between the RF side and the backhaul side is not an issue, and expensive DSP circuitry for spectrum compression is not required. For example, bandwidth from a band, such as the LMDS band, could be utilized which would equal the spectrum or bandwidth of the signals handled by the RF antenna 14*a*. The present invention is particularly desirable for 3G/CDMA technology wherein the spectral efficiency is greater and less backhaul bandwidth would be necessary.

In one embodiment, by providing essentially the same backhaul bandwidth, in the presently largely unused and low cost LMDS band, as is required for the total bandwidth of the RF channels, such as cellular/PCS channels, the requirement for compression is eliminated and simple LMDS-to-RF and RF-to-LMDS frequency converters are used between the two antennas 14*a* and 16*a*, thus eliminating the need for base station DSP and modulation/demodulation electronics. Having eliminated the need at the base station for processing the signals between the antenna 14*a* and the backhaul link antenna 16*a*, digital processing and other processing of the signals for multiple base stations may be performed at the MSC/CO rather than at each base station. This significantly reduces the complexity and costs of the base station hardware and the costs of the overall systems.

While one described embodiment focuses upon the above-discussed PCS/cellular and LMDS bands, the invention may be used in other bands as well. For example, an unused (unlicensed) band with sufficient available bandwidth could be used in place of the LMDS band for backhaul purposes. Also, such a system could be used to facilitate a wireless backhaul link for communications systems other than PCS/cellular, i.e., using other RF bands. The chart below lists other bands, for example and without limitation, which might be substituted for the RF band (band A), and backhaul band (band B), in the embodiment described in detail herein:

| band A | band B |
| --- | --- |
| PCS 1900 | MMDS 2500 |
| PCS 1900 | MMDS 2100 |
| 3G 1900 | MMDS 2500 |
| Cellular 800 | PCS 1900 |
| Cellular 800 | MMDS 2500 |
| 4G | MMDS 2500, 2100 |
| WCS 2300 | MMDS 2500, 2100 |
| PCS 1900 | WCS 2300 |
| Cell 800 | WCS 2300 |
| PCS 1900 | 2400 Unlicensed (802.11 b band) |
| Cell 800 | 2400 Unlicensed (802.11 b band) |
| PCS-1900 | 5.1 GHz UNII band |
| PCS-1900 | 5.8 GHz UNII band |
| Cell 800 | 5.1 GHZ UNII band |
| Cell 800 | 5.8 GHz UNII band |
| 2400 Unlicensed | MMDS 2100 band |
| 2400 Unlicensed | MMDS 2500 band |
| 5.1 UNII band | MMDS 2100 band |
| 5.1 UNII band | MMDS 2500 band |
| 5.8 UNII band | MMDS 2100 band |
| 5.8 UNII band | MMDS 2500 band |
| PCS 1900 band | Unlicensed 900 band (U.S.) |
| Cell 800 band | Unlicensed 900 band |
| UMTS band 1900/2100 | MMDS 2100 band |
| UMTS band 1900/2100 | MMDS 2500 band |
| UMTS band 1900/2100 | Unlicensed 2400 band |
| UMTS band 1900/2100 | Unlicensed 5.1 UNII band |
| UMTS band 1900/2100 | Unlicensed 5.8 UNII band |

-continued

| band A | band B |
|---|---|
| UMTS band 1900/2100 | PCS-1900 band (use the existing U.S. 3G infrastructure to translate Euro/Asia frequencies |
| UMTS band 1900/2100 | Cell-800 band |
| UMTS 1900/2100 | 3.5 GHz band (this is a license band; the European MMDS band) |
| DCS-1800 | 3.5 GHz |
| DCS-900 | 3.5 GHz |
| DCS-1800 | 2400 Unlicensed (this band is unlicensed throughout the world: 83 MHz wide) |
| DCS-900 | 2400 Unlicensed |
| DCS-1800 | 5.1 GHz UNII |
| DCS-900 | 5.1 GHz UNII |
| DCS-1800 | 5.8 UNII |
| DCS-900 | 5.8 UNII |

Band A frequencies are embedded in the current/original base station modulation and transceiver hardware, as well as the terminal equipment.

DCS-1800 is currently the world GSM standard, migrating to GPRS, then EDGE, then W-CDMA.

Figure 4:
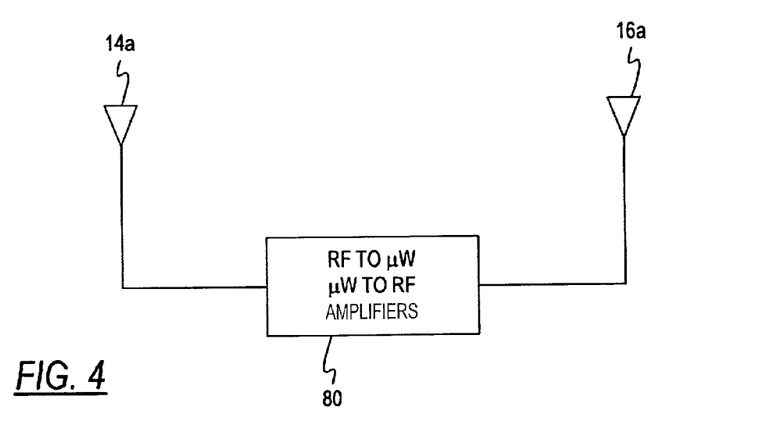
FIG. 4 is a schematic diagram of an embodiment of the invention.

Returning to FIG. 3, the electronics module 80, located at the tower top, may also include amplifiers for amplifying the signals to be respectively transmitted by the RF antenna 14a and the microwave backhaul antenna 16a, respectively, in addition to hardware for RF-to-LMDS and LMDS-to-RF frequency conversion. Module 80 is also shown in FIG. 4, wherein the RF-to-LMDS converter, the LMDS-to-RF converter and the amplifiers are indicated as a part of the electronics module 80.

Figure 5:
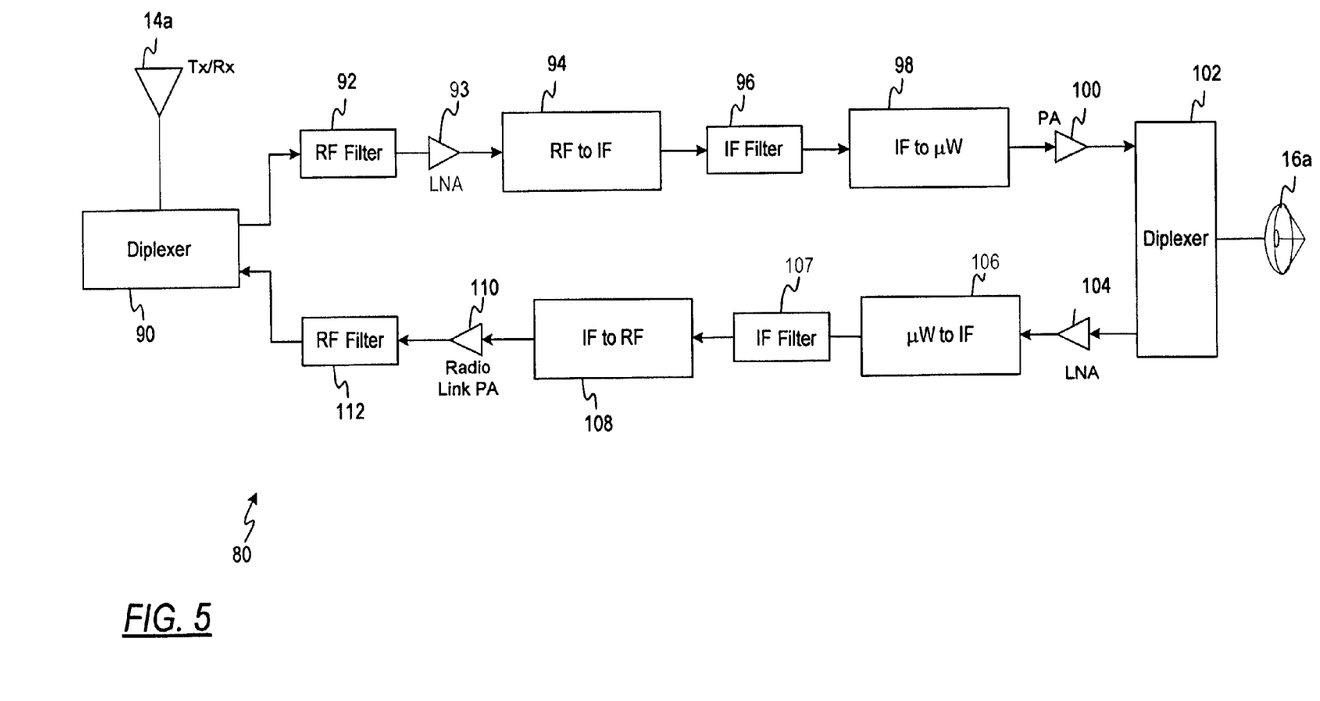
FIGS. 5, 6, and 7 are block diagrams showing electronics in accordance with several embodiments of the invention.
Figure 6:
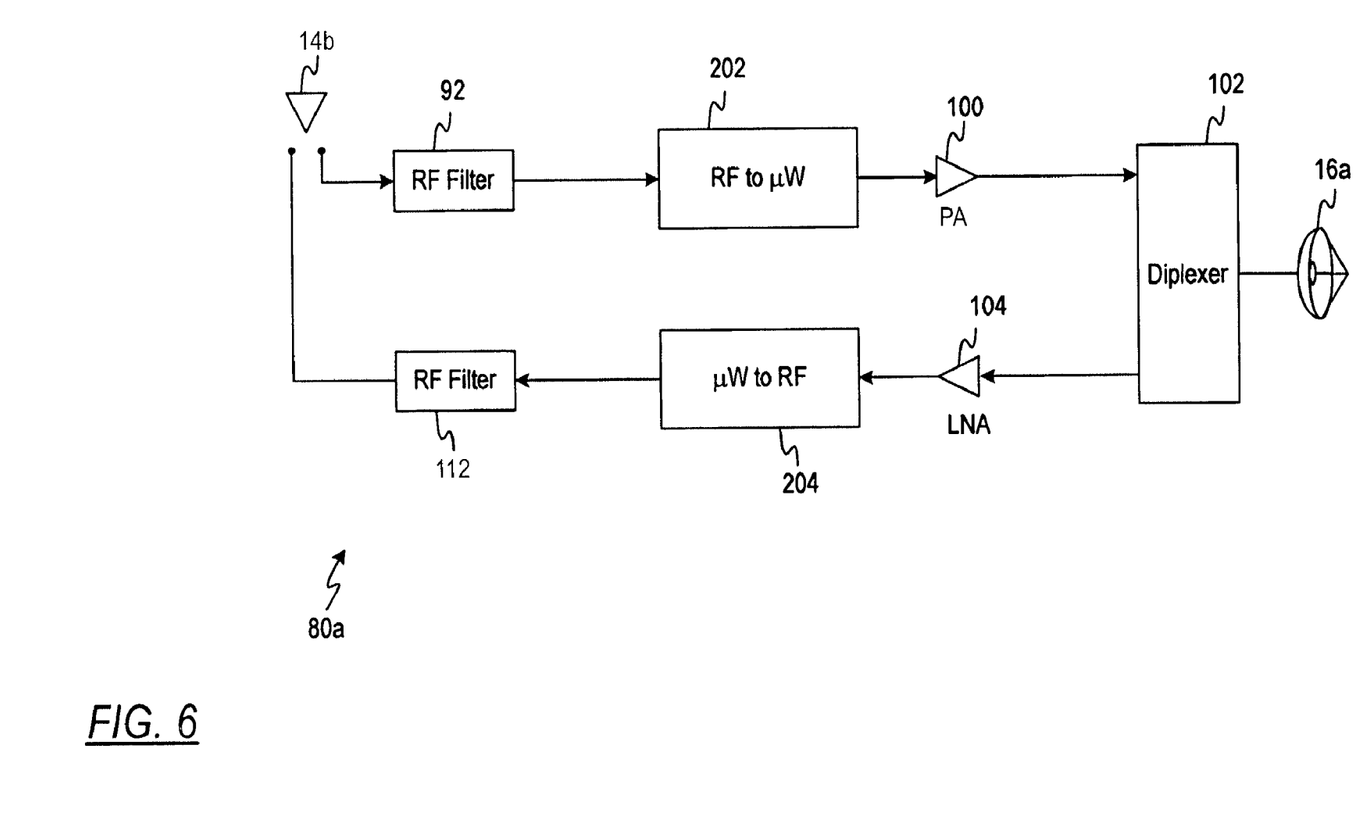
Figure 7:
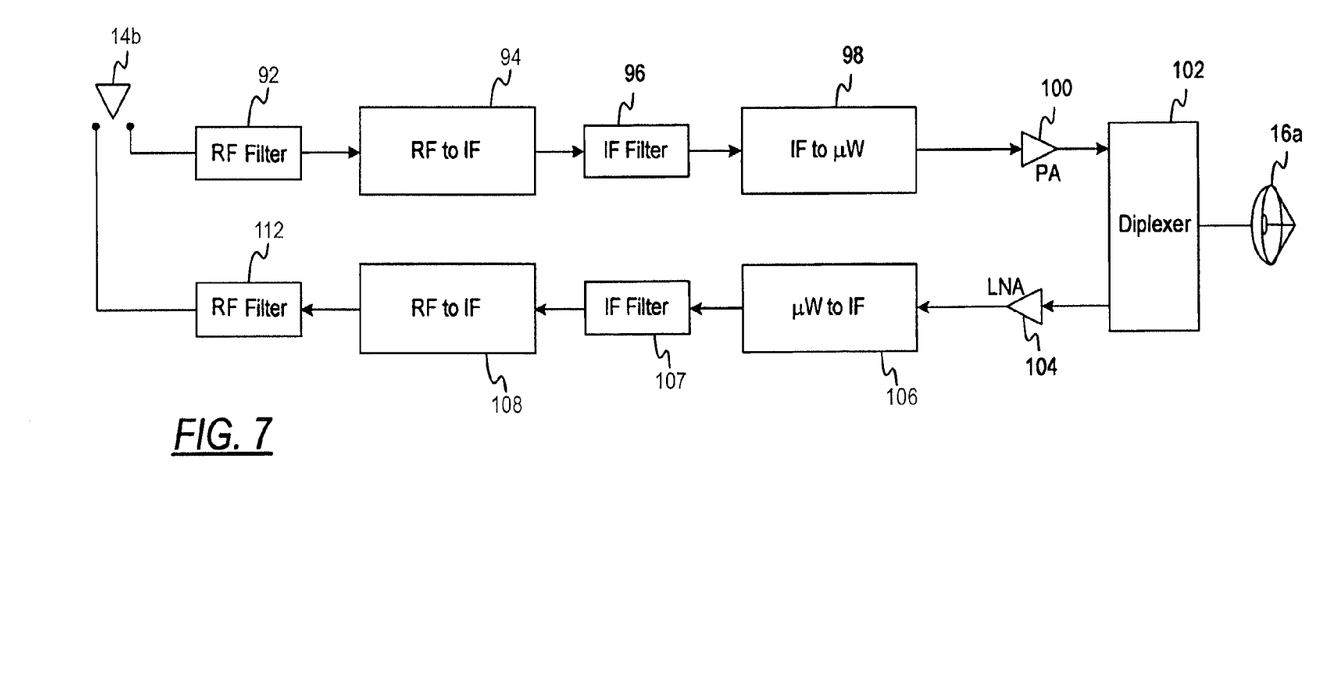

FIGS. 5–7 show various embodiments of the electronics module 80 which may be used between the RF link antennas 14a and a microwave backhaul antenna 16a.

In FIG. 5, a single RF antenna 14a is used for both transmit and receive functions, and is a passive antenna. Antenna 14a is coupled with a frequency diplexer 90 for separating the transmit and receive signals. The receive or uplink signals from the antenna 14a are fed through diplexer 90 to RF-to-microwave converter circuitry which includes an RF filter 92, an amplifier, such as an LNA 93, RF-to-IF downconverter or downconversion circuitry 94, an IF filter 96, an IF-to-microwave upconverter or upconversion circuitry 98, and a power amplifier 100. The signal is routed through diplexer 102 which serves to separate receive and transmit signals at the microwave backhaul antenna 16a. The signal is then backhauled to an appropriate switching center directly to be processed and demodulated at the switching center, rather than at the base station. In that way, modulation and demodulation circuitry and other DSP functions may be centralized at a switching center or office, rather than at each base station. This results in a significant cost savings per base station and overall.

The reverse, or downlink, path from the diplexer 102 directs signals received by the backhaul antenna 16a from the switching center through a low noise amplifier 104, to microwave-to-IF downconverter circuitry 106, which places the signal in a form to be converted to RF and transmitted from the tower. An IF filter 107 filters the signal before it is routed to an IF-to-RF upconverter, or upconversion circuitry 108. The RF signal is amplified by a power amplifier 110 and filtered by an RF filter 112 before passing through the frequency diplexer 90 to the RF antenna 14a.

Another version of the electronics package 80a is illustrated in FIG. 6 for use with antenna 14b, which is a distributed active antenna DAA, for example, of the type described in the co-pending application Ser. No. 09/422,418, filed Oct. 21, 1999. The antenna 14b may include separate transmit and receive radiating elements, or a single set of radiating element with a diplexer. Respective power amplifiers and low noise amplifiers for the transmit and receive functions are incorporated with the antenna and are located closely adjacent the radiating elements. Uplink signals received at the antenna 14b are RF filtered by filter 92 and are fed through an RF-to-microwave upconverter 202 which converts directly from RF to microwave. The signal is then amplified by a power amplifier 100 which feeds the signal to the microwave backhaul antenna 16a by way of a frequency diplexer 102, as described above with reference to FIG. 5. Downlink signals received at the backhaul link antenna 16a are directed through an LNA 104 to a microwave-to-RF downconverter 204 which downconverts from the microwave backhaul spectrum directly to RF. The signals are filtered by RF filter 112 and forwarded to the active antenna 14b.

In yet another embodiment, shown in FIG. 7, a distributed active antenna 14b (DAA) is also utilized in much the same fashion as described above with reference to FIG. 6, but the hardware utilizes a conversion step to IF before converting to the RF or microwave spectrum, somewhat similar to FIG. 5. Signals from RF antenna 14b are RF filtered through filter 92 and are delivered to an RF-to-IF downconverter 94 which feeds the resultant IF signal to an IF filter 96 and then to an IF-to-microwave converter 98. The signal from the converter 98 is routed to the diplexer 102 through a power amplifier 100 to be transmitted by the microwave backhaul antenna 16a. Working in the downlink direction, the signals received by the backhaul like antenna 16a are directed by the frequency diplexer 102 to a low noise amplifier 104 which amplifies the signal and feeds it to a microwave-to-IF downconverter 106. The down-converted IF signal is filtered through an IF filter 107, and is directed to the IF-to-RF upconverter 108. The signals are filtered through RF filter 112 and forwarded to the active antenna 14b.

Figure 8:
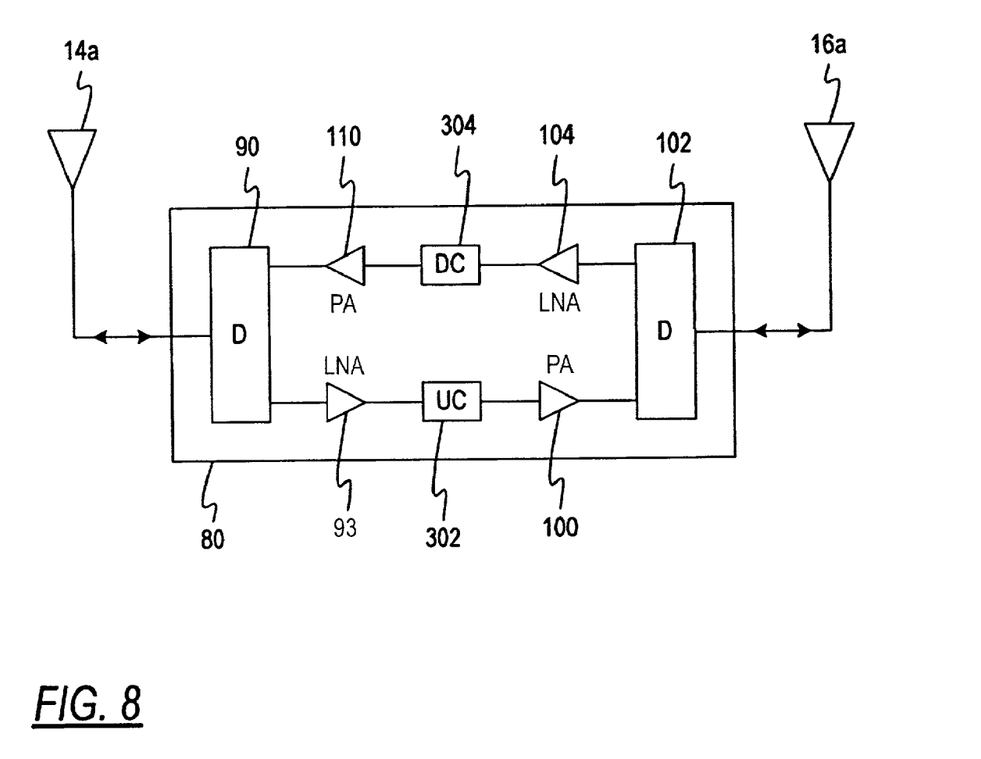
FIG. 8 is a block diagram in accordance with another embodiment of the invention.

Referring to FIG. 8, a modular electronics package including the basic elements of any of the embodiments of FIGS. 5–7 is shown. In the embodiment of FIG. 8, use of a single passive antenna element 14a is contemplated, whereby a diplexer 90 is provided. As explained above with reference to FIGS. 5–7, when separate transmit and receive antenna elements are utilized, a diplexer 90 may be omitted. The remaining components include a frequency diplexer 102 for the microwave backhaul link antenna 16a, power amplifiers 110 and 100, low noise amplifiers 93 and 104. Respective upconverter and downconverter circuitry 302, 304 may take the form of the up/down converter circuits shown in any of FIGS. 5, 6 and 7. That is, conversion may be achieved through an IF stage, or directly between RF and microwave. Advantageously, this modular electronics package may be conveniently mounted on the tower, eliminating a need for expensive DSP and modulator/demodulator electronics in a ground unit and associated coaxial cable running up and down the tower both for the RF side and the backhaul side. Only a relatively simple DC power cable for DC power to the electronics package need be provided, and this in turn may be eliminated if onboard power in the form of batteries, rechargeable batteries, solar power, or the like is provided.

Figure 9:
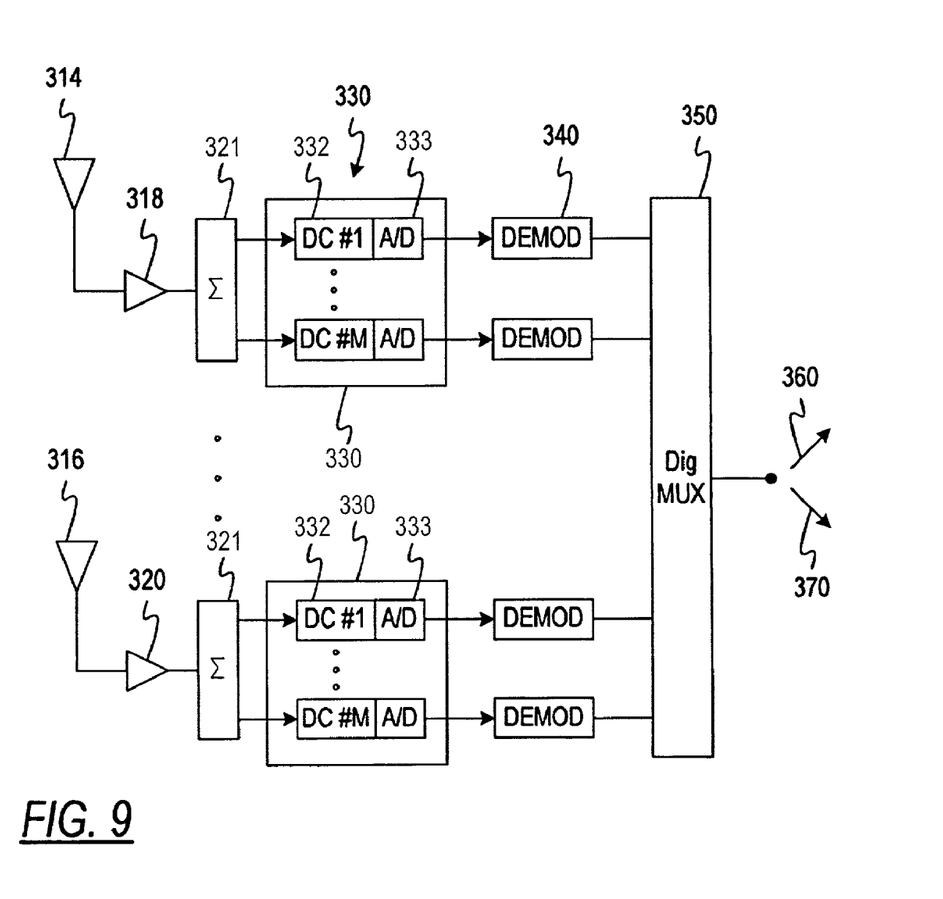
FIG. 9 is a block diagram of one embodiment of a three sector system configured in accordance with principles of the invention.

Referring to FIG. 9, a multiple sector system for the receive or uplink path is shown. Respective sector antennas 314, 316, etc. are provided (one for each of the three or more sectors). Each antenna is provided with a low noise amplifier 318, 320. This system supports a total of M code division multiple access (CDMA) carriers per sector, with N channels per carrier. Accordingly, multiple downconverter blocks 330 are provided with down converter subcircuits 332 for each of the M carriers in the sector. That is, M downconverter circuits 332 are associated with each sector antenna 314, 316, etc. Splitter circuits 321 route the carriers to their respective down converter circuits 332. The downconverter circuits 332 may also be provided with analog-to-digital conversion or converters 333. Thus, a digital signal is fed to a digital signal processor (DSP)/demodulator block 340. In the system of FIG. 9, a total of M×N of the DSP/demodulator blocks 340 will be provided for each sector for handling the N channels per M carriers. All of the demodulator outputs are fed to a high speed digital multiplexer 350 which may deliver the signals to a central office or MSC either by a fiber optic link 360 or a microwave backhaul 370. In the case of the fiber optic link 360, an additional fiber converter may also be utilized. As an alternative to the arrangement shown in FIG. 9, a single wideband downconverter could be utilized for each sector, for PCS type bandwidths.

Figure 10:
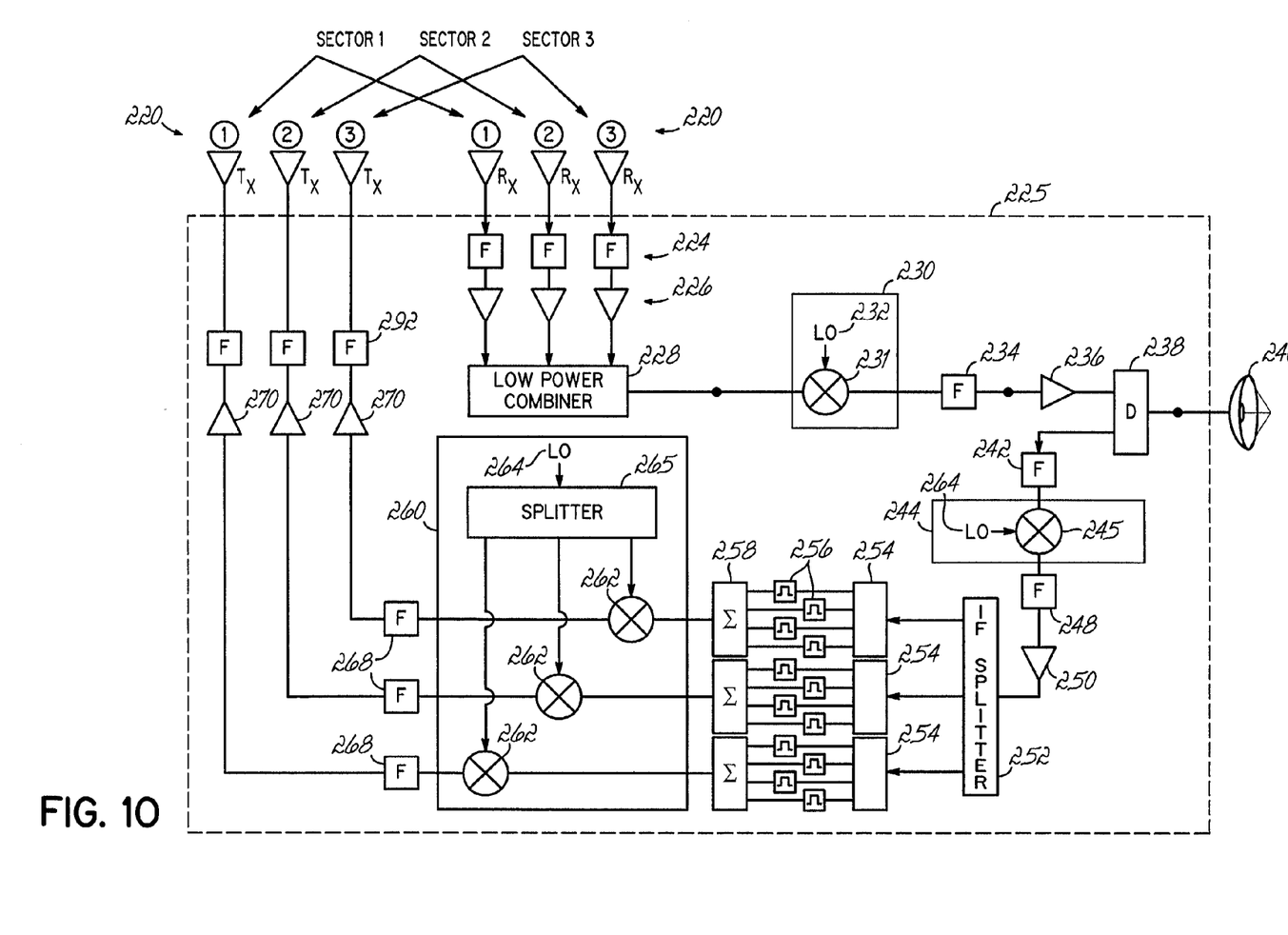
FIG. 10 illustrates a block diagram of another embodiment of the invention.

FIG. 10 illustrates an alternative embodiment of the present invention showing hardware components for a three-sector system wherein the signals are converted from RF to microwave and backhauled via microwave link. Specifically, transmit antennas 220 and receive antennas 222 are illustrated for each of three sectors. Other numbers of sectors might also be utilized in accordance with the principles of the present invention, although three sectors represents a typical base station site. Furthermore, while the antennas 220, 222 are illustrated as separate elements, a single element might serve both purposes and the uplink and downlink signals may be coupled thereto with appropriate diplexing hardware, as is known in the art.

Uplink signals received by antennas 222 are routed to an appropriate bank of RF filters 224, and are then amplified, such as by LNAs 226. The signals from each of the three sectors are then combined through a low power combiner 228. The combined signals are then upconverted from RF to a microwave backhaul band, in accordance with the principles of the present invention utilizing upconverter circuitry 230. The upconverter circuitry 230 may include a mixer 231, fed by an appropriate local oscillator LO signal 232. The upconverted signal is then filtered at filter circuit 234 and amplified, using a linear microwave power amplifier 236. The diplexer 238 routes the signal to a microwave backhaul antenna which may be a dish antenna, as illustrated, or a flat panel antenna. In one embodiment of the invention, as discussed above, the RF signal may be directly converted to an appropriate microwave band, such as the LMDS band, where it is then transmitted by antenna 240 back to an MSC/CO.

The upconverter circuitry 230 is illustrated showing a single mixer 231 fed by a single LO 232. Alternatively, and as discussed below with respect to the downlink signal, the conversion may occur in various stages, wherein the signal is first downconverted from RF to IF, appropriately filtered, and then upconverted from IF to the microwave backhaul band. Still further, the downconversion from RF to IF and the upconversion from IF to the microwave backhaul band may occur in multiple IF stages, each having its own appropriate LO. In a further alternative, as discussed above, direct conversion may occur from RF to the microwave backhaul band.

In the downlink side, backhaul signals received by antenna 240 are routed through diplexer 238 as a microwave signal to an appropriate filter 242. The downconverter 244, which may include an appropriate mixer 245, or mixers, and an appropriate LO 246, or multiple LOs, downconverts the microwave signal to an IF signal. The IF signal may be further filtered with filter 248 and then amplified with an IF preamplifier 250. Prior to upconverting to RF, the signals for the three sectors are split, such as by a 3:1 IF power splitter 252, and then are routed to other appropriate splitters 254 for further splitting the signals to be filtered. The split signals are then fed into a bank of IF filters 256, such as SAW filters. The filtered signals are then combined in appropriate combining circuitry 258 to be upconverted from IF to RF. Illustrated in FIG. 10 is upconverter circuitry 260, which may include appropriate mixers and LO signals. For example, as shown in FIG. 10, individual mixers 252 are shown for each sector, which are fed by an LO signal 264, which is split by a splitter to be routed to each of the mixers. As noted above, the upconversion from IF may involve a single mixing stage. Alternatively, multiple mixing stages might be utilized with multiple IF steps prior to upconversion to RF. The RF signals are then filtered by appropriate RF filters 268, and are amplified by linear power amps 270 and again filtered by filters 272 before being transmitted through the various sector antennas 220. In accordance with the principles of the invention, direct conversion occurs between the RF spectrum and the backhaul spectrum without the necessity of expensive and complex modulation/demodulation circuitry and DSP at the base station.

The overall system between the antennas indicated by reference numeral 225 may be incorporated in electronics at the ground level, or within an electronics module proximate the tower top, and proximate the transmit/receive antennas 220, 222.

Figure 11:
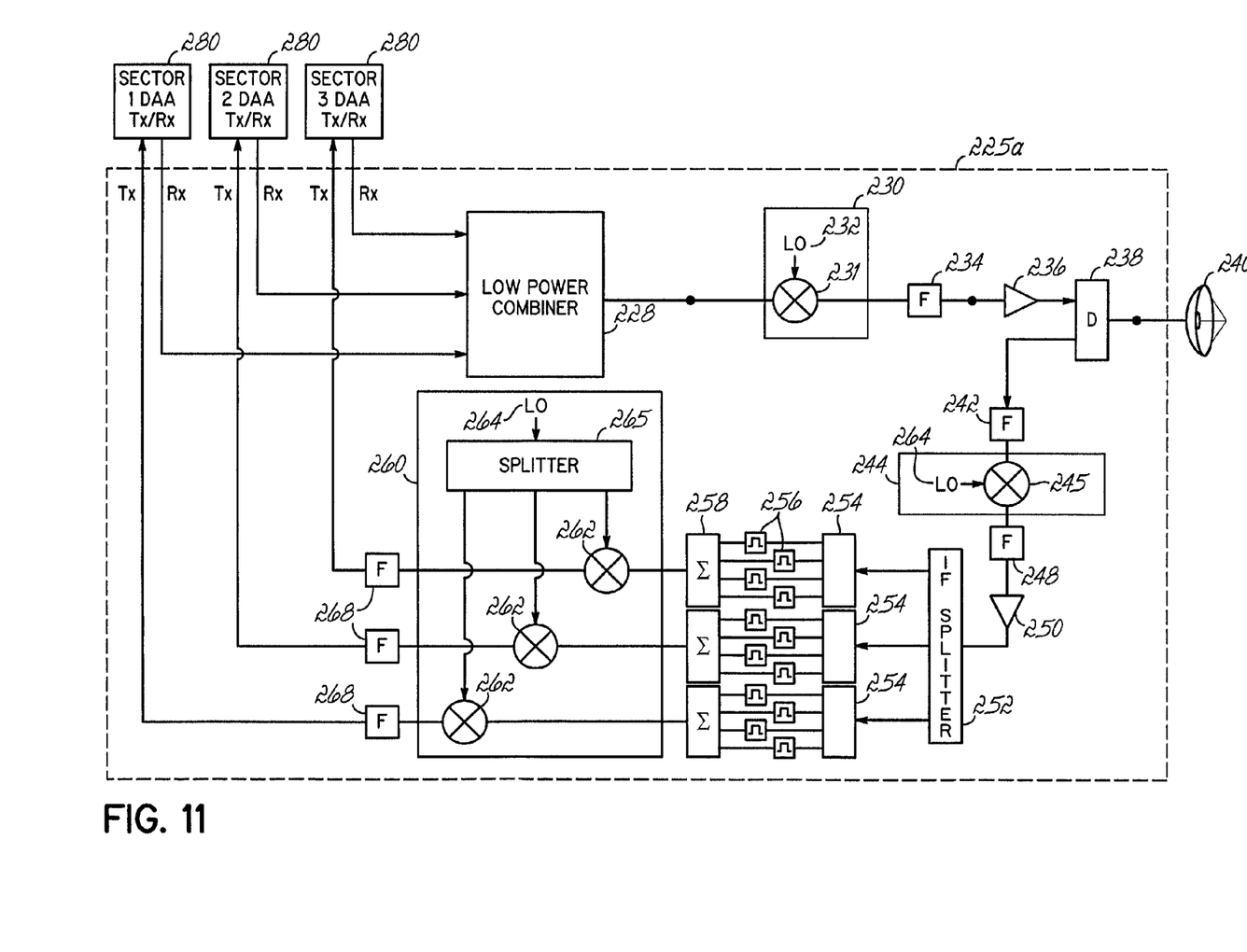
FIG. 11 illustrates a block diagram of another embodiment of the invention.

FIG. 11 illustrates an alternative embodiment of the invention, wherein active antennas (DAA) are utilized, and various filtering and amplifier circuitry is incorporated within the antenna structure. The embodiment 225a, as illustrated in FIG. 11, utilizes similar reference numerals for the components which are similar to the embodiment illustrated in FIG. 10.

Specifically, antennas may be utilized which incorporate amplification and appropriate filtering with the radiating elements. Herein, such antennas will be referred to as distributed active antennas, or DAA. Referring to FIG. 11, a distributed active antenna, or antennas 280 may be utilized for each sector. Such DAA structures 280 might incorporate a single antenna which handles both transmit and receive functions. Alternatively, multiple active antennas might be utilized which incorporate amplifiers therewith. For example, a transmit antenna might incorporate the power amplifiers therewith, and a receive antenna might incorporate the LNAs therewith proximate the respective radiating elements. If a single antenna structure handles both transmit and receive, a diplexer (not shown) would be utilized. Utilizing such DAA structures, and similar to the system described in FIG. 10, the receive signals are directed to a combiner 228 and are appropriately converted for backhaul through antenna 240, as described above. Similarly, downlink signals from the backhaul antenna 240 are routed through appropriate filtering and conversion circuitry to be transmitted from the DAA structures 280. Amplification and RF filtering structures, such as amplifiers 226 and 270 are not illustrated in FIG. 11 as they are incorporated in the DAA structures 280.

Figure 12:
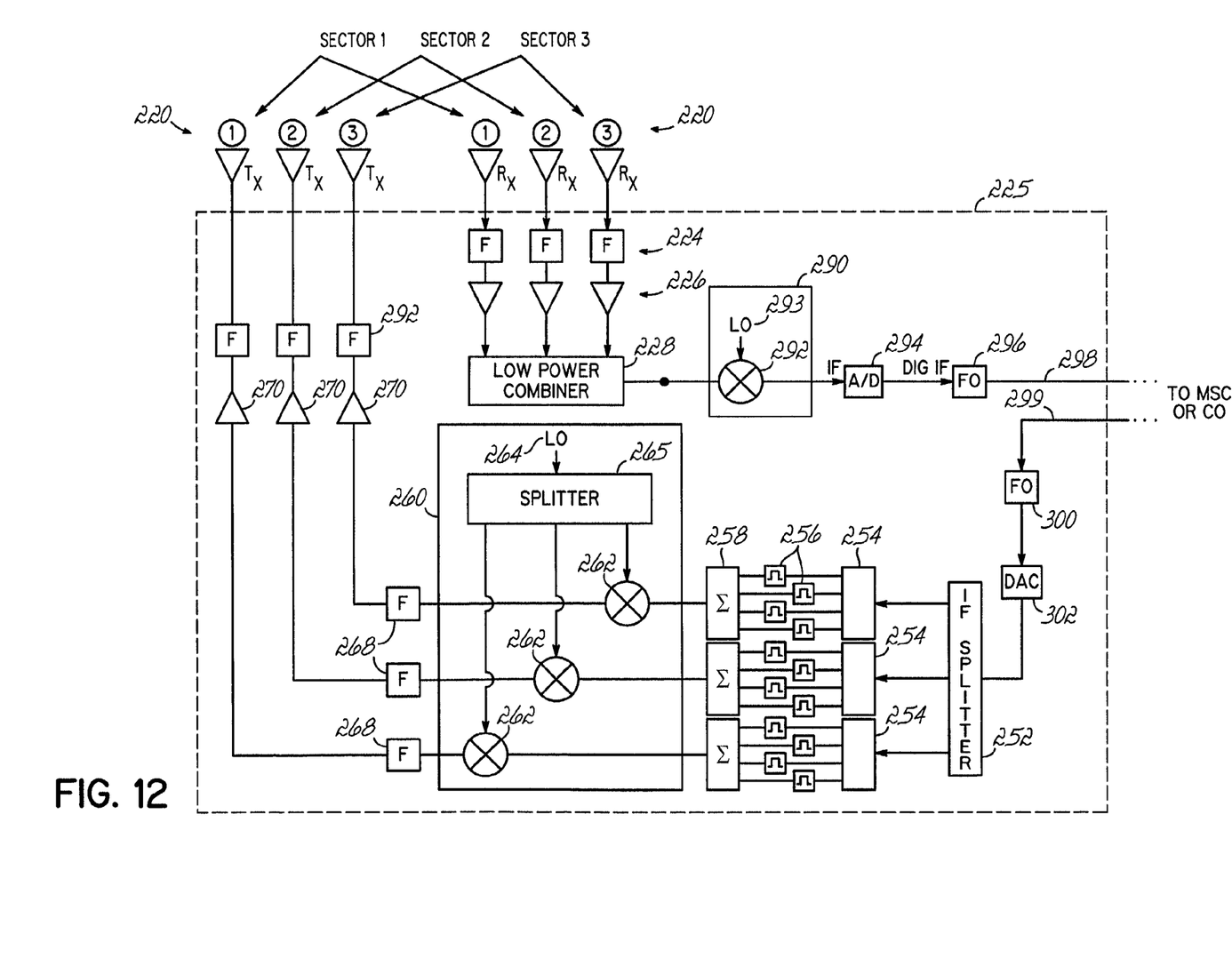
FIG. 12 illustrates a block diagram of another embodiment of the invention.
Figure 13:
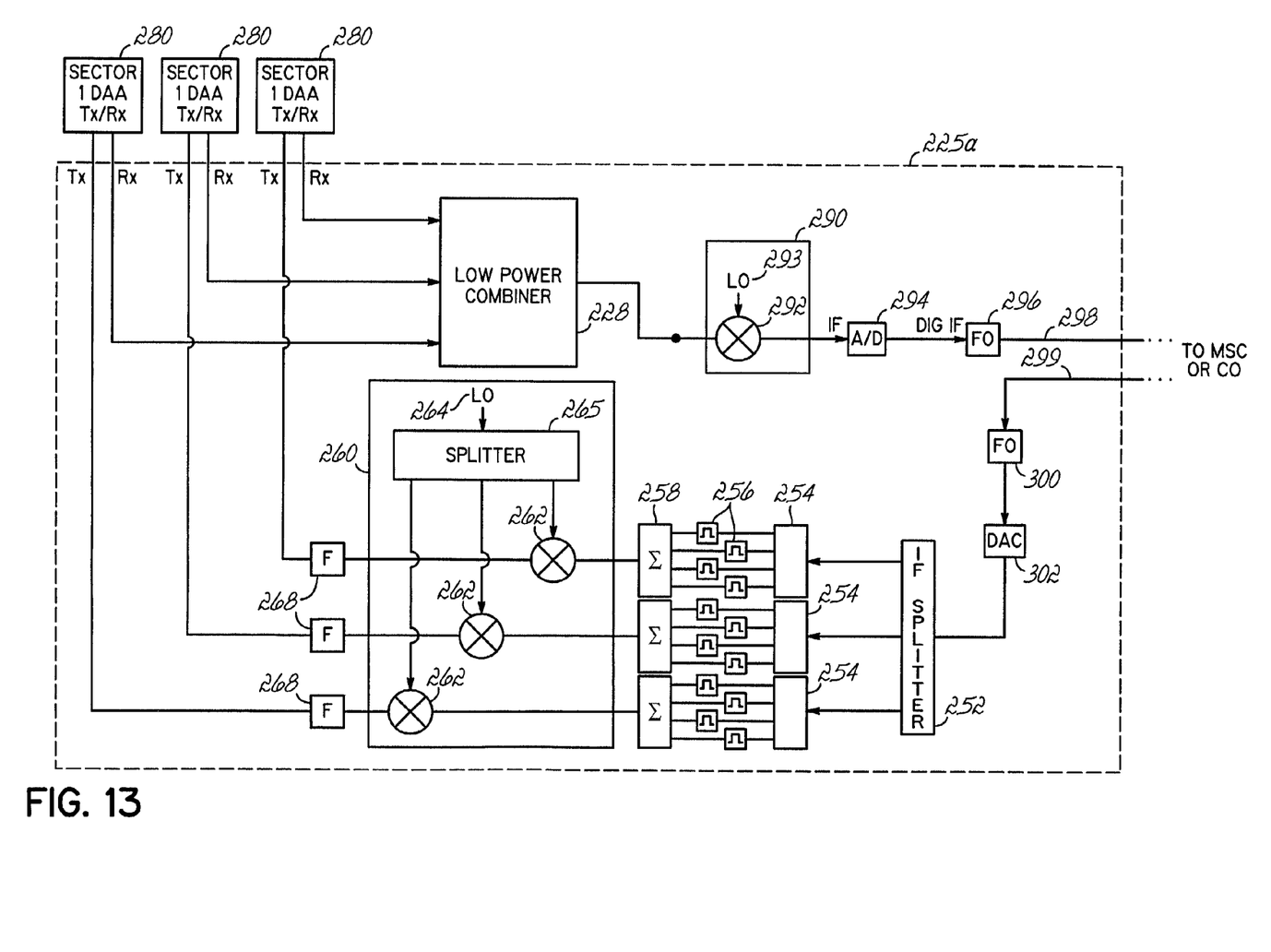
FIG. 13 illustrates a block diagram of another embodiment of the invention.

FIGS. 12 and 13 illustrate additional embodiments of the invention. However, in accordance with another aspect of the invention, the backhaul is accomplished over fiber, rather than through microwave wireless backhaul. The embodiments illustrated in FIGS. 12 and 13 still eliminate expensive modulation/demodulation circuitry and DSP at the base station sites, but rather than upconverting to a microwave frequency, the RF signals are handled in a suitable digital IF format for transfer over fiber optic fibers back to a main switching center (MSC) or central office (CO).

FIG. 12 utilizes components similar in some regards to the system shown in FIG. 10, and thus like components will be given similar reference numerals as utilized in FIG. 10. Similarly, FIG. 13 utilizes various components similar to those set forth in FIG. 11, and therefore, like reference numerals will also be utilized where appropriate.

Specifically, turning now to FIG. 12, signals received from the sector antennas are routed, after filtering and amplification, to a combiner circuit 228. However, rather than directing the signals to conversion circuitry 230 for converting to a microwave frequency for wireless backhaul, the output of the combiner 228 is directed to conversion circuitry 290 with an appropriate mixer or multiple mixers 292, and appropriate LO signals 293 which are used to convert the RF signals to an IF band. The IF signals are then digitized by appropriate analog-to-digital (A/D) circuitry 294. The digital IF signals are then routed to appropriate fiber converters or fiber transceiver circuitry 296 for routing over fiber optic lines or fiber cables 298 back to an MSC or CO. In the embodiment illustrated in FIG. 12, the signals are combined prior to downconversion to IF frequency and digitization. However, in an alternative embodiment, each of the receive signals for a sector may be individually downconverted to an appropriate IF band and then individually digitized to the A/D circuitry 294 to be sent back on an individual fiber associated with the receive signals for the sector. As noted above, the downconversion step may involve a single downconversion from RF to an IF band, or may include multiple downconversion steps to intermediate IF bands before the final IF band is digitized. The digital IF signals are then backhauled over fiber 298 back to the MSC or CO for demodulation and processing.

Conversely, the modulated downlink signals from the MSC or CO on fiber line 299 are appropriately handled by a fiber converter or fiber transceiver circuitry 300, and then converted to an analog signal by digital-to-analog circuitry 302. The downlink signals are converted to a suitable IF band where they are further split, filtered, and upconverted, as discussed above with respect to FIG. 10, for transmission through the antennas 220.

Turning now to FIG. 13, a system similar to that illustrated in FIG. 12 is shown, utilizing the DAA structures as described with respect to FIG. 11. Accordingly, reference numerals similar to those utilized in FIGS. 11 and 12 are used where appropriate.

With respect to FIGS. 12 and 13, while those figures disclose systems utilizing analog-to-digital circuitry for forming digital IF signals, other systems might directly correspond with a backhaul destination through analog IF, rather than digital IF. To that end, the A/D circuitry might be eliminated.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A base station for a wireless communications system comprising:
    at least one RF antenna for transceiving RF signals with a plurality of devices in an RF communication frequency band;
    a backhaul system for transceiving signals with a backhaul destination in a backhaul band different from and outside of the RF communication frequency band, the backhaul band including one of a microwave band and an IF band;
    translation circuitry configured to be interfaced between the RF antenna and the backhaul system;
    the translation circuitry operable for translating the frequency of signals directly between the RF band for the RF antenna and the backhaul band for the backhaul antenna without conversion to audio to provide direct communications between a base station and a backhaul destination, wherein the conversion to and from audio is handled at a backhaul destination remote from the base station.

2. The base station of claim 1 wherein the translation circuitry is operable for translating the frequency of the signals between the different bands without modulation, and wherein modulation is handled at the backhaul destination.

3. The base station of claim 1 wherein the translation circuitry is operable for translating RF signals, in a plurality of channels spread over an RF frequency band, into the backhaul band.

4. The base station of claim 1 wherein the backhaul band includes at least a band from the group of: LMDS, MMDS 2500, MMDS 2100, PCS 1900, WCS 2300, 2400 UNLICENSED, 5.1 GHz UNII, 5.8 GHz UNII, 900 UNLICENSED, CELL 800, 3.5 GHZ.

5. The base station of claim 1 wherein the RF band includes at least a band from the group of: PCS 1900, 3G 1900, CELLULAR 800, 4G, WCS 2300, 2400 UNLICENSED, 5.1 GHz UNII, 5.8 GHz UNII, UMTS 1900/2100, DCS-1800, DCS 900.

6. The base station of claim 1 wherein said translation circuitry is operable for translating signals to an intermediate IF band when translating between the RF band and the microwave backhaul band.

7. The base station of claim 1 further comprising a power amplifier coupled to the translation circuitry for amplifying the translated signals.

8. The base station of claim 7 wherein the power amplifier is a part of the RF antenna.

9. The base station of claim 1 further comprising a low noise amplifier coupled to the translation circuitry for amplifying the signals prior to translation.

10. The base station of claim 9 wherein the low noise amplifier is a part of the RF antenna.

11. The base station of claim 1 wherein the translation circuitry is configured for mounting on a tower structure associated with the base station.

12. A base station for a wireless communications system comprising:
    at least one RF antenna for transceiving RF signals with a plurality of devices in an RF communication frequency band;
    a backhaul interface for interfacing with a backhaul destination in an IF backhaul band different from and outside the RF band;
    translation circuitry configured to be interfaced between the RF antenna and the backhaul interface;

the translation circuitry operable for translating the frequency of signals directly between the RF band for the RF antenna and the IF backhaul band for the backhaul interface without conversion to audio to provide direct communications between a base station and a backhaul destination wherein the conversion to and from audio is handled at the backhaul destination remote from the base station.

13. The base station of claim 12 wherein the translation circuitry is operable for translating the frequency of the signals between the different bands without modulation.

14. The base station of claim 12 wherein the translation circuitry is configured for mounting on a tower structure associated with the base station.

15. The base station of claim 12 wherein the backhaul interface includes a cable interface.

16. The base station of claim 12 further comprising D/A circuitry operable for converting signals between analog and digital formats between the RF antenna and the backhaul interface.

17. The base station of claim 12 further comprising D/A circuitry operable for converting between digital and analog IF signals to provide digital IF backhaul.

18. The base station of claim 15 wherein the cable interface further comprises fiber transceiver circuitry coupled to the translation circuitry for providing communications over fiber between the base station and a backhaul destination.

19. A method for backhauling signals in a wireless communications system comprising:
  transceiving RF signals with a plurality of devices using an RF antenna network including an RF antenna operating in an RF communication frequency band;
  communicating with a backhaul destination through a backhaul network antenna operating in a backhaul band different from and outside of the RF band, the backhaul band including one of a microwave band and an IF band;
  translating the frequency of signals directly between the RF band of the RF network and the backhaul band of the backhaul network without conversion to audio to provide direct communications between the RF antenna network and a backhaul destination;
  converting the backhauled signals to and from audio at a backhaul destination remote from the base station.

20. The method of claim 19 further comprising translating the frequency of the signals between the different bands without modulation.

21. The method of claim 20 further comprising translating RF signals, in a plurality of channels spread over an RF frequency band, into the backhaul band.

22. The method of claim 19 wherein the RF channels have a total bandwidth comprising a first bandwidth, and further comprising translating the RF signals into a backhaul band having a second bandwidth at least as great as said first bandwidth.

23. The method of claim 19 wherein the backhaul network is a wireless microwave network, and further comprising translating the signals between an RF band and a microwave backhaul band.

24. The method of claim 19 wherein the backhaul network is a wireless network operating in a backhaul band including at least a band from the group of: LMDS, MMDS 2500, MMDS 2100, PCS 1900, WCS 2300, 2400 UNLICENSED, 5.1 GHz UNII, 5.8 GHz UNII, 900 UNLICENSED, CELL 800, 3.5 GHZ.

25. The method of claim 19 further comprising transceiving RF signals over an RF frequency band which includes at least a band from the group of: PCS 1900, 3G 1900, CELLULAR 800, 4G, WCS 2300, 2400 UNLICENSED, 5.1 GHz UNII, 5.8 GHz UNII, UMTS 1900/2100, DCS-1800, DCS 900.

26. The method of claim 23 further comprising translating signals to an intermediate IF band when translating between the RF band and the microwave backhaul band.

27. The method of claim 19 further comprising translating the signals on a tower structure proximate the RF antenna network.

28. A method for backhauling in a wireless communication system comprising:
  transceiving RF signals with a plurality of devices using an RF network including an RF antenna operating in an RF communication frequency band;
  communicating with a backhaul destination through a backhaul network operating in a backhaul band different from and outside of the RF band, the backhaul band including one of a microwave band and an IF band;
  translating the frequency of signals directly between the RF band of the RF network and the backhaul band of the backhaul network without modulation to provide direct communications between the RF network and a backhaul destination;
  performing modulation and demodulation of the backhaul signals at a backhaul destination remote from the base station.

29. The method of claim 28 wherein the RF signals include channels having a total bandwidth comprising a first bandwidth, the method further comprising translating the signals into a backhaul band having a second bandwidth at least as great as said first bandwidth.

30. The method of claim 28 wherein the backhaul band includes at least a band from the group of: LMDS, MMDS 2500, MMDS 2100, PCS 1900, WCS 2300, 2400 UNLICENSED, 5.1 GHz UNII, 5.8 GHz UNII, 900 UNLICENSED, CELL 800, 3.5 GHZ.

31. The method of claim 28 further comprising converting the signals in an IF backhaul band to a fiber format for providing communications over fiber with the backhaul destination.

32. The method of claim 28 further comprising translating signals to an intermediate IF band when translating between the RF band and the backhaul band.

33. The method of claim 28 further comprising translating the signals on a tower structure proximate the RF antenna.

34. The method of claim 28 further comprising converting signals between analog and digital formats between the RF band and an IF backhaul band.

* * * * *

UNITED STATES PATENT AND TRADEMARK OFFICE
CERTIFICATE OF CORRECTION

PATENT NO. : 7,133,697 B2  Page 1 of 1
APPLICATION NO. : 10/145298
DATED : November 7, 2006
INVENTOR(S) : Mano D. Judd et al.

It is certified that error appears in the above-identified patent and that said Letters Patent is hereby corrected as shown below:

Column 13
Line 35 reads ". . . backhaul network antenna operating in a . . ." and should read -- . . . backhaul network operating in a. . . --.

Signed and Sealed this

Eighth Day of July, 2008

JON W. DUDAS
*Director of the United States Patent and Trademark Office*